US011931752B2

(12) United States Patent
Wu et al.

(10) Patent No.: US 11,931,752 B2

(45) Date of Patent: Mar. 19, 2024

(54) NON-CONTACT PRECISION PNEUMATIC INJECTION VALVE

(71) Applicant: Suzhou Hsen-mez Automation Co., Ltd., Suzhou (CN)

(72) Inventors: Xingguo Wu, Suzhou (CN); Gang Li, Suzhou (CN)

(73) Assignee: Suzhou Hsen-mez Automation Co., Ltd., Jiangsu (CN)

( * ) Notice: Subject to any disclaimer, the term of this patent is extended or adjusted under 35 U.S.C. 154(b) by 415 days.

(21) Appl. No.: 17/504,359

(22) Filed: Oct. 18, 2021

(65) Prior Publication Data

US 2022/0323976 A1 Oct. 13, 2022

(51) Int. Cl.

*B05B 1/30* (2006.01)
*B05C 5/02* (2006.01)
*B05C 17/005* (2006.01)

(52) U.S. Cl.

CPC ............ *B05B 1/306* (2013.01); *B05C 5/0225* (2013.01); *B05C 5/0237* (2013.01); *B05C 17/00546* (2013.01)

(58) Field of Classification Search

CPC ...................................................... B05B 1/306
USPC .......................................................... 222/518
See application file for complete search history.

(56) References Cited

U.S. PATENT DOCUMENTS

| | | | | |
|---|---|---|---|---|
| 3,627,207 | A * | 12/1971 | Hohmuth | F02M 61/205 239/533.6 |
| 4,263,338 | A * | 4/1981 | Rentmeester | B05B 7/1613 427/559 |
| 4,930,669 | A * | 6/1990 | Dickau | B05B 1/304 222/518 |
| 5,205,439 | A * | 4/1993 | Sturm | H05K 13/0469 222/1 |
| 5,794,825 | A * | 8/1998 | Gordon | F16K 41/003 277/647 |
| 6,253,957 | B1 * | 7/2001 | Messerly | B05C 5/0225 222/61 |
| 2022/0034698 | A1 * | 2/2022 | Fliess | B05C 5/0237 |

* cited by examiner

*Primary Examiner* — Jeremy Carroll
(74) *Attorney, Agent, or Firm* — Joe Zheng

(57) ABSTRACT

A non-contact precision pneumatic injection valve includes a cylinder, a needle disposed inside the cylinder, and an adjustable stroke limiting component. The adjustable stroke limiting component includes a thread-toothed column threadedly engaging an upper end of the cylinder; a spring-limiting column disposed inside and fixedly attached to the thread-toothed column, the spring-limiting column having a first protrusion ring; a spring column axially movably disposed inside the spring-limiting column and having a second protrusion ring, a lower end of the spring column defining a stroke of the needle; and a spring. One end of the spring fixedly engages the first protrusion ring and the other end of the spring fixedly engages the second protrusion so that the spring keeps the spring column at least partially inside the spring-limiting column. The spring biases the lower end of the spring column toward the needle.

20 Claims, 3 Drawing Sheets

NON-CONTACT PRECISION PNEUMATIC INJECTION VALVE

CROSS-REFERENCES TO RELATED APPLICATIONS

This application claims the priorities of Chinese Patent Application No.: 202120707798.9 and 202120814294.7, filed on Apr. 8, 2021 and Apr. 20, 2021 respectively, the entire contents of which are hereby incorporated by reference

TECHNICAL FIELD

The present invention is related to the area of liquid dispensing valves, and in particular to a non-contact precision pneumatic injection valve.

BACKGROUND

A pneumatic injection valve is a type of glue dispensing valves, which realizes non-contact glue dispensing by use of air power, without lifting a vertical or Z shaft of the machine. However, the existing pneumatic injection valve has an unchanged needle stroke so that the pneumatic injection valve is provided for one type of glue, thus inheriting considerable limitation to the glue valve. Furthermore, the current pneumatic injection valve is difficult to mount and dismount, rending it lack of convenience and consistency.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

General speaking, the present invention provides a non-contact precision pneumatic injection valve so as to solve at least the above described problems of single glue and certain limitations of the glue valves in use. According to one embodiment, the present invention discloses a non-contact precision pneumatic injection valve that comprises a cylinder, a needle disposed inside the cylinder, and an adjustable stroke limiting component. The adjustable stroke limiting component comprises a thread-toothed column threadedly engaging an upper end of the cylinder; a spring-limiting column disposed inside and fixedly attached to the thread-toothed column, the spring-limiting column having a first protrusion ring; a spring column axially movably disposed inside the spring-limiting column and having a second protrusion ring, a lower end of the spring column defining a stroke of the needle and a spring. One end of the spring fixedly engages the first protrusion ring and the other end of the spring fixedly engages the second protrusion so that the spring keeps the spring column at least partially inside the spring-limiting column. The spring biases the lower end of the spring column toward the needle.

According to another embodiment, the present invention is a non-contact precision pneumatic injection valve that includes a cylinder, a needle disposed inside the cylinder, and a nozzle assembly releasably attached to a lower end of the cylinder. The nozzle assembly comprises a fixing claw, a nozzle, a glue chamber disposed between the lower end of the cylinder and the nozzle and connectable to a glue source, and a nozzle heater surrounding the nozzle, wherein the fixing claw engages the nozzle heater and rotatably engages the lower end of the cylinder to clamp the lower end of the cylinder, the glue chamber, the nozzle and the nozzle heater together.

In order to solve at least the above described technical problems, the present invention employs one or more of the following technical solutions: a nozzle assembly is provided in the non-contact precision pneumatic injection valve. A cylinder is disposed above the nozzle assembly, a chamber in communication with the nozzle assembly is provided inside the cylinder, an air inlet and an air outlet are disposed respectively on one side of the cylinder respectively, a high-pressure inlet air assembly and an outlet air assembly are disposed at the air inlet and the air outlet, respectively, a needle is disposed inside the chamber, and a stroke limiting component for limiting a stroke of the needle is disposed above the cylinder.

The stroke limiting component may be configured to adjust a moving stroke of the needle so as to adjust a strike strength of the needle so that the needle can be matched with different kinds of liquids or glues. In this way, different types of glues of different viscosities can be injected accurately.

Furthermore, the stroke limiting component includes a thread-toothed column, an external thread connected with a thread of the cylinder is disposed on a surface of the thread-toothed column, a spring-limiting column is disposed inside the thread-toothed column, a first protrusion ring is disposed on a surface of the spring-limiting column, a spring column capable of protruding into the spring limiting column is disposed in the spring-limiting column, a second protrusion ring is disposed at a lower end of the spring column, a spring is sleeved around the spring limiting column and the spring column, and the spring is limited between the first protrusion ring and the second protrusion ring.

Furthermore, a rotary handle is fixedly connected around an upper end of the thread-toothed column, and a fitting groove is disposed at the bottom of the rotary handle. The thread-toothed column includes a middle adjustment portion and a lower connection portion. A third protrusion ring is provided at the lower connection portion, and the external thread is disposed at an outer edge of the third protrusion ring. A fitting ring is sleeved on the adjustment portion, and a fitting portion fittable into the fitting groove is disposed at an upper end of the fitting ring. When the fitting portion moves away from the fitting groove, the fitting ring is capable of rotating around the adjustment portion. Further, a scale ring is disposed outside the fitting ring, a spring sheet is sleeved on the adjustment portion, and the spring sheet is located between the fitting ring and the third protrusion ring.

Furthermore, the high-pressure inlet air assembly includes an inlet air pipe, an inlet air connector and a solenoid valve connected in sequence as well as a solenoid valve sealing ring disposed between the inlet air connector and the solenoid valve.

Furthermore, the outlet air assembly includes an outlet air sealing ring disposed at the air outlet. An outlet air channel in communication with the chamber is disposed on the cylinder. The outlet air assembly further includes an outlet air connector in communication with the outlet air channel and an outlet air pipe connected with the outlet air connector.

Furthermore, the nozzle assembly includes a fixing claw fixed at the bottom of the glue cylinder, a glue chamber is disposed at the bottom of the fixing claw, a nozzle is disposed at the bottom of the glue chamber, and a glue inlet is disposed at a side of the glue chamber. The nozzle assembly further includes a nozzle heater sleeved around the nozzle.

Furthermore, a spring-energized sealing ring is disposed between the glue chamber and the glue cylinder, and a nozzle sealing ring is disposed between the nozzle and the glue chamber.

Furthermore, a cable box is sleeved outside the solenoid valve, a cable for controlling the solenoid valve is placed in the cable box, and a gluepipe holder is fixed at a side of the cable box.

Furthermore, a chamber seat is disposed at a side of the glue cylinder, the outlet air connector is fixed on the glue cylinder, and a communication opening for communicating the glue chamber with the outlet air connector is disposed on the chamber seat. Further, washers are disposed between the glue cylinder and the chamber seat.

Furthermore, a hanging bracket is disposed at a side of the chamber seat.

The present invention has at least the following advantages and benefits. In structure, the stroke limiting component is disposed to adjust a strike strength of the needle so as to match with different glues. Thus, different types of glues of different viscosities can be accurately injected. Therefore, the injection valve is widely suitable for different types of glues or liquids. Further, by adopting non-contact injection dispensing, the glue dispensing capacity can be greatly increased without lifting the Z shaft of the machine. Furthermore, the glue drop weight can be accurately controlled with high repeatability, ensuring consistency of dispensing amounts. The heater is configured to realize closed-loop heating to ensure the fluid has a constant viscosity in the entire channel. At the same time, modularized designing adds to dismounting/mounting and cleaning maintenance.

BRIEF DESCRIPTIONS OF THE DRAWINGS

These and other features, aspects, and advantages of the present invention will become better understood with regard to the following description, appended claims, and accompanying drawings where:

Figure 1:
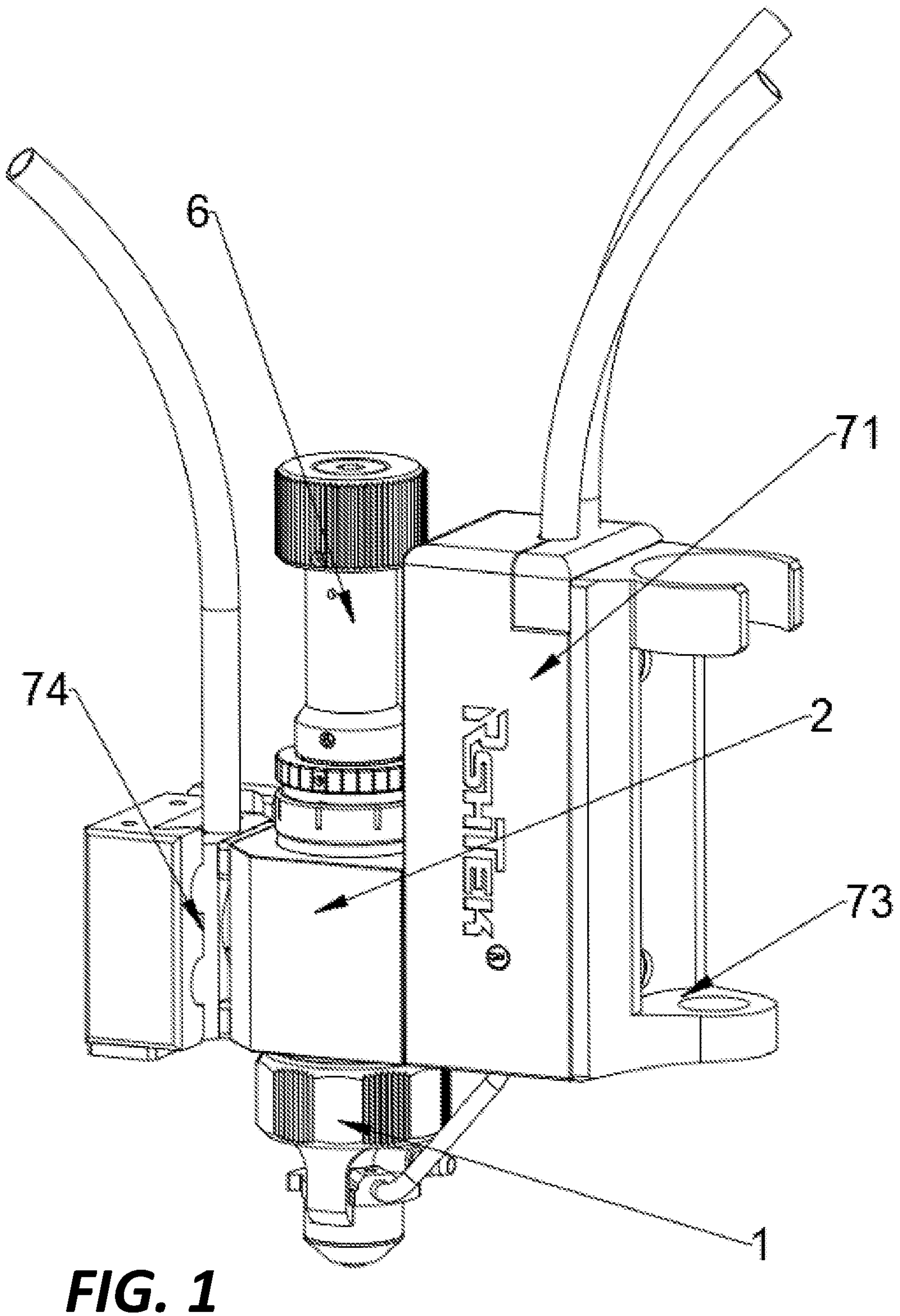
FIG. 1 is a structural schematic diagram of a pneumatic injection valve.

Numerals of the drawings are described as follows: nozzle assembly 1, fixing claw 11, glue chamber 12, nozzle 13, nozzle heater 14, spring-energized sealing ring 15, nozzle sealing ring 16, cylinder 2, high-pressure inlet air assembly 3, inlet air pipe 31, inlet air connector 32, solenoid valve 33, solenoid valve sealing ring 34, outlet air assembly 4, outlet air sealing ring 41, outlet air connector 42, outlet air pipe 43, needle 5, adjustable stroke limiting component 6, thread-toothed column 61, a third protrusion ring 61, a spring limiting column 62, a first protrusion ring 62*a*, spring column 63, a second protrusion ring 63*a*, a spring 64, a rotary handle 65, a fitting groove 66, a fitting ring 67, a scale ring 68, a spring sheet 69, a cable box 71, a cable 72, a glue container holder 73, a chamber seat 74, washers 75, and a hanging bracket 76.

DETAILED DESCRIPTIONS OF EMBODIMENTS

In order to make the above object, features and advantages of the present invention clearer, the present disclosure will be detailed below in combination with the accompanying drawings and specific embodiments. Many details in the following descriptions help to fully understand the present invention. However, the present invention can be carried out in manners different from the manners described herein. Those skilled in the art may make similar improvements without departing from the essence of the present invention. Therefore, the present invention is not limited to the specific embodiments described below.

It should be noted that when an element is called "fixed" to another element, such element may be directly located on the another element or an intermediate element is present; when one element is considered as connected to another element, such element may be directly connected to the another element or an intermediate element is present at the same time.

Unless otherwise stated, all technical and scientific terms used herein have the same meanings as understood by those skilled in the art. The terms used in the specification of the present disclosure are used only for the purpose of describing the specific embodiments rather than limiting the present invention. The terms "and/or" used herein include any or all combinations of one or more associated listed items.

Figure 2:
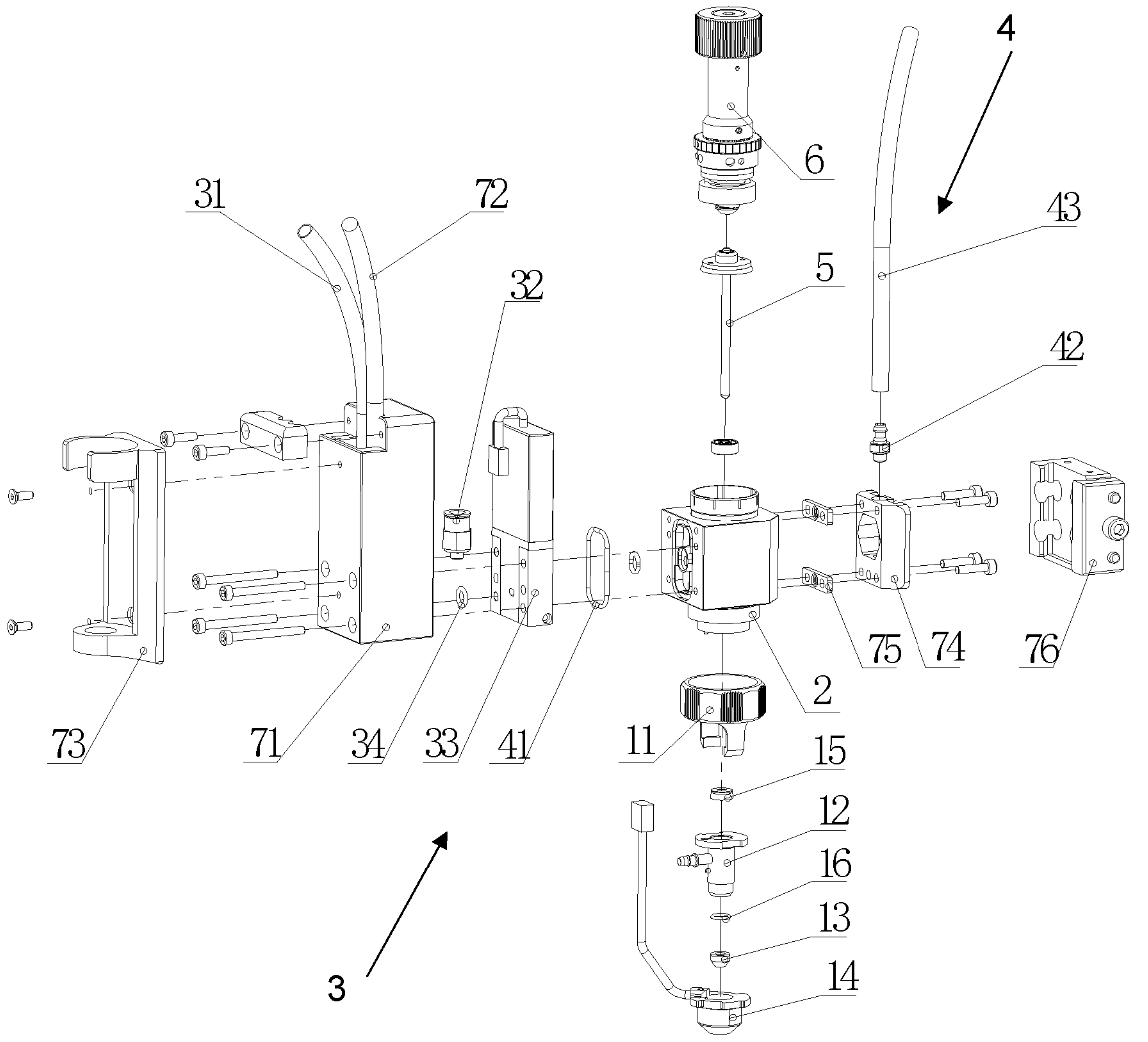
FIG. 2 is an exploded view of a pneumatic injection valve.

As shown in FIGS. 1 and 2, according to one embodiment of the present invention, provided is a non-contact precision pneumatic injection valve including a nozzle assembly 1. A case or cylinder 2 is disposed above a nozzle assembly 1, a chamber in communication with the nozzle assembly 1 is defined inside the cylinder 2, and an air inlet and an air outlet are disposed at a side of the cylinder 2. A high-pressure inlet air assembly 3 and an outlet air assembly 4 are disposed at the air inlet and the air outlet, respectively. A needle 5 is disposed inside the chamber, and a stroke limiting component 6 for limiting a stroke of the needle 5 is disposed above the cylinder 2. In operation, high-pressure air is introduced into the air inlet via the high-pressure inlet air assembly 3 to lift the needle 5 under the action of the incoming high-pressure air, and then the high-pressure air flows out of the chamber via the outlet air assembly 4 to allow the needle 5 to drop under the action of gravity and/or the force of a spring so as to strike glue in the nozzle assembly 1, and inject or spray the glue out of the nozzle assembly 1. Furthermore, the stroke of the needle 5 may be adjusted by the stroke limiting component 6 according to the properties of different types of glues so that a strike strength of the needle 5 can be changed. In this case, the pneumatic injection valve can be used for many types of glues, poor phenomena such as glue cannot be injected or coated, scattered dots or bubbling and the like can be reduced.

Figure 3:
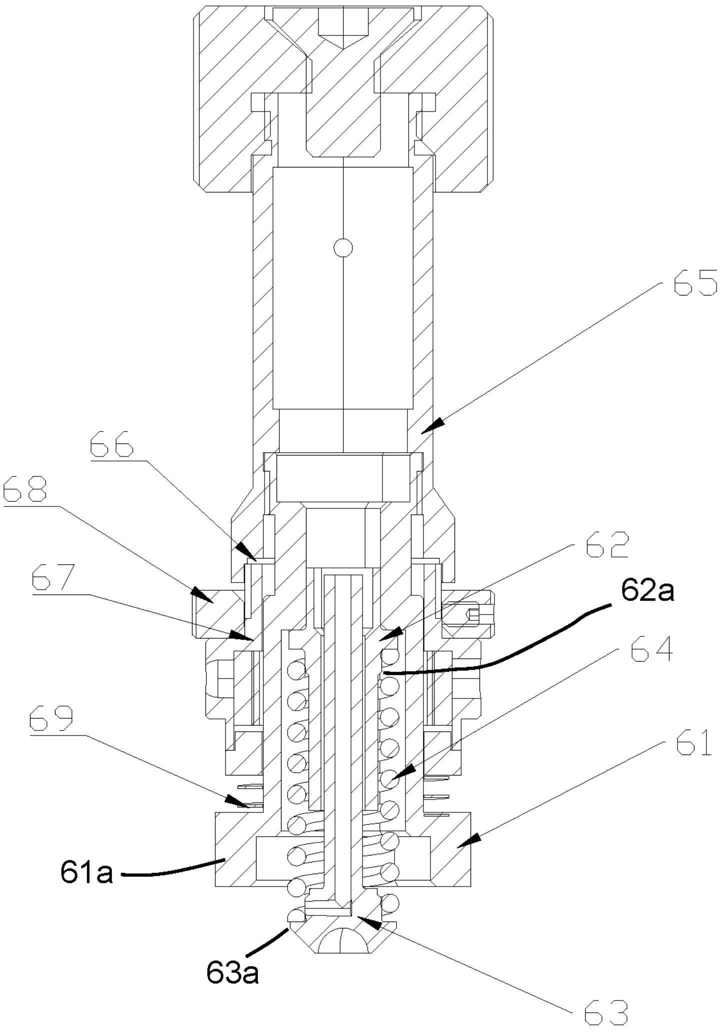
FIG. 3 is a sectional view of a stroke limiting component.

Based on the above and as illustrated in FIG. 3, the stroke limiting component 6 includes a thread-toothed column 61, and an external thread connectable with a matching thread of the cylinder 2 is disposed on a surface of the thread-toothed column 61. A spring limiting column 62 is disposed inside and fixed to the thread-toothed column 61, and a first protrusion ring 62*a* is provided on a surface of the spring limiting column 62. A spring column 63 capable of protruding or moving into the spring limiting column 62 is provided, and a second protrusion ring 63*a* is disposed at a lower end of the spring column 63. A spring 64 such as a compression spring is sleeved around the spring limiting column 62 and the spring column 63, and the spring 64 is limited between the first protrusion ring 62*a* and the second protrusion ring 63*a*. More specifically, as shown in FIG. 3, in some embodiments, one end of the spring 64 firmly or fixedly engages the first protrusion ring 62*a* by friction or tension and the other end of the spring 64 firmly or fixedly engages the second protrusion ring 63*a* by friction or tension so that the spring 64 prevents the spring column 63 from completely dropping out of the spring-limited column 62. During adjustment of the stroke limiting component 6, the thread-toothed column 61 fully compresses the spring 64 by use of its external thread in an initial state and at this time, the needle 5 in the chamber of the cylinder 2 cannot be lifted; when the thread of the thread-toothed column 61 is released upward, the spring 64 is slightly released; the thread-toothed column 61 is adjusted repeatedly until an optimal height or stroke required by a corresponding glue liquid for glue injection is reached.

Based on the above and as illustrated in FIG. 3, a rotary handle 65 is fixedly connected to an upper end of the thread-toothed column 61, and a fitting groove 66 is provided at the lower end of the rotary handle 65. In other words, in some embodiments, the rotary handle 65 has a toothed exterior surface on a lower end thereof. The thread-toothed column 61 includes a middle adjustment portion and a lower connection portion. A third protrusion ring 61*a* is disposed at the connection portion, and the external thread is disposed at an outer edge of the third protrusion ring 61*a*. A fitting ring 67 is sleeved on the adjustment portion, and a fitting portion fittable into the fitting groove 66 is provided at an inner surface of the upper end of the fitting ring 67. In other words, in some embodiments, the fitting ring 67 has a matching toothed interior face on an upper end thereof. When the fitting portion moves away from and disengages the fitting groove 66 on the rotary handle 65, the fitting ring 67 is capable of rotating around the adjustment portion. Further, a scale ring or calibration loop 68 is provided on the fitting ring 67. A spring sheet 69 such as a compression spring is sleeved on the adjustment portion, and the spring sheet 69 is located between the fitting ring 67 and the third protrusion ring 61*a*. During adjustment, the rotary handle 65 can drive the thread-toothed column 61 to rotate relative to the cylinder 2 and the scale ring 68 outside the fitting ring 67 is driven to rotate at the same time. The scale ring 68 is configured to give a prompt for a height adjustment of the thread-toothed column 61 relative to the cylinder 2. In order to ensure the accuracy of the scale ring 68, the scale ring 68 is pressed down to separate the fitting portion of the fitting ring 67 from the fitting groove 66 so as to help an operator to rotate the scale ring 68 to zero. After setting the scale ring 68 to zero, the operator may release the scale ring 68, and the spring sheet 69 lifts up the scale ring 68 and the fitting ring 67 to mate the fitting portion of the fitting ring 67 with the fitting groove 66, thereby completing adjustment.

Based on the above, the high-pressure inlet air assembly 3 includes an inlet air pipe 31, an inlet air connector 32 and a solenoid valve 33 connected in sequence as well as a solenoid valve sealing ring 34 disposed between the inlet air connector 32 and the solenoid valve 33. The outlet air assembly 4 includes an outlet air sealing ring 41 disposed at the air outlet. The outlet air assembly 4 further includes an outlet air channel in communication with the chamber is disposed on the cylinder 2. The outlet air assembly 4 further includes an outlet air connector 42 in communication with the outlet air channel and an outlet air pipe 43 connected with the outlet air connector 42. When glue is to be injected, the solenoid valve 33 is firstly turned on to allow high-pressure air to enter the chamber and lift up the needle 5; when the solenoid valve 33 is turned off, the high-pressure air is discharged through the outlet air channel, the outlet air connector 42 and the outlet air pipe 43. In this case, there is no air pressure on the needle 5 and the needle 5 drops under its gravity and/or the force of the spring 64 to strike glue in the nozzle assembly 1 and inject the glue, thus achieving accurate control over glue injection.

Based on the above and as illustrated in FIG. 2, the nozzle assembly 1 includes a fixing claw 11 releasably fixed at the bottom of the glue cylinder 2, a glue chamber 12 is disposed at the bottom of the fixing claw 11, a nozzle 13 is disposed at the bottom of the glue chamber 12, and a glue inlet is disposed or provided at a side of the glue chamber 12. The nozzle assembly 1 further includes a nozzle heater 14 sleeved around the nozzle 13. A spring-energized or spring-biased sealing ring 15 is disposed between the glue chamber 12 and the glue cylinder 2, and a nozzle sealing ring 16 is disposed between the nozzle 13 and the glue chamber 12. These sealing rings 15, 16 are used to prevent glue leakage, and the nozzle heater 14 is disposed to ensure the glue has a constant viscosity in the entire channel, thus ensuring consistency of dispensing glue amounts.

Based on the above and as illustrated in FIG. 2, a cable box 71 is sleeved around the solenoid valve 33, a cable 72 for controlling the solenoid valve 33 is placed in the cable box 71, and a glue pipe or container holder 73 is fixed at a side of the cable box 71. A chamber seat 74 is fixed at a side of the glue cylinder 2, the outlet air connector 42 is fixed on the chamber seat 74, and a communication opening for communicating the chamber with the outlet air connector 42 is disposed on the chamber seat 74. Further, washers 75 are disposed between the glue cylinder 2 and the chamber seat 74. The glue container holder 73 is used to hold a glue container which is in communication with the glue inlet of the glue chamber 12 to introduce glue into the glue chamber r12. The cable box 71 is used to accommodate the cable 72, the inlet air connector 32, and the solenoid valve 33 and the like. The chamber seat 74 is used to fix the outlet air connector 42 and the like. The modularized designing of these structures adds to easy dismounting/mounting and cleaning maintenance.

Based on the above and as illustrated in FIG. 2, a hanging bracket 76 is disposed at a side of the chamber seat 74 to facilitate fixedly mounting the pneumatic injection valve.

The above specific embodiments further describe the object, technical solutions and the beneficial effects of the present disclosure in details. It should be understood that the above descriptions are merely specific embodiments of the present disclosure and shall not be intended to limit the scope of the present disclosure. Any modifications, equivalent substitutions, and improvements and the like made within the spirit and principle of the present disclosure shall all be encompassed in the scope of protection of the present disclosure.

What is claimed is:

1. A non-contact precision pneumatic injection valve comprising:

a cylinder;

a needle disposed inside the cylinder; and an adjustable stroke limiting component comprising:

a thread-toothed column threadedly engaging an upper end of the cylinder;

a spring-limiting column disposed inside and fixedly attached to the thread-toothed column, the spring-limiting column comprising a first protrusion ring;

a spring column axially movably disposed inside the spring-limiting column and comprising a second protrusion ring, a lower end of the spring column defining a stroke of the needle; and a spring, one end of the spring fixedly engaging the first protrusion ring and the other end of the spring fixedly engaging the second protrusion so that the spring keeps the spring column at least partially inside the spring-limiting column, the spring biasing the lower end of the spring column toward the needle.

2. The non-contact precision pneumatic injection valve of claim 1, wherein in a first position the thread-toothed column is threaded relative to the cylinder to compress the spring so that the spring column cannot move axially relative to the needle, and in a second position the thread-toothed column is threaded away from the cylinder in order to change the stroke of the needle.

3. The non-contact precision pneumatic injection valve of claim 1, wherein the one end of the spring fixedly engages the first protrusion ring by friction or tension.

4. The non-contact precision pneumatic injection valve of claim 1, wherein the other end of the spring fixedly engages the second protrusion ring by friction or tension.

5. The non-contact precision pneumatic injection valve of claim 1, wherein the thread-toothed column comprises a third protrusion ring that threadedly engages the upper end of the cylinder.

6. The non-contact precision pneumatic injection valve of claim 5, wherein the adjustable stroke limiting component further comprises a handle fixedly connected to the thread-toothed column, a fitting ring rotatably mounted on the thread-toothed column and being slidably engageable with the handle, a scale ring on the fitting ring, and a second spring disposed between the fitting ring and the third protrusion ring to bias the fitting ring so that the fitting ring engages the handle in a first position.

7. The non-contact precision pneumatic injection valve of claim 6, wherein when the fitting ring is axially pushed toward the third protrusion ring, the fitting ring disengages the handle in a second position so that the fitting ring and the scale ring can be rotated relative to the thread-toothed column to set the scale ring to zero.

8. The non-contact precision pneumatic injection valve of claim 6, wherein the handle has a toothed exterior surface on a lower end of the handle, and the fitting ring has a matching toothed interior surface on an upper end of the fitting ring, and when the matching toothed interior surface of the fitting ring engages the toothed exterior surface of the handle, the fitting ring is no longer rotatable relative to the thread-toothed column.

9. The non-contact precision pneumatic injection valve of claim 1, further comprising a nozzle assembly releasably attached to a lower end of the cylinder.

10. The non-contact precision pneumatic injection valve of claim 9, wherein the nozzle assembly comprises a fixing claw, a nozzle, a glue chamber disposed between the lower end of the cylinder and the nozzle and connectable to a glue source, and a nozzle heater surrounding the nozzle, and wherein the fixing claw engages the nozzle heater and rotatably engages the lower end of the cylinder to clamp the lower end of the cylinder, the glue chamber, the nozzle and the nozzle heater together.

11. The non-contact precision pneumatic injection valve of claim 10, wherein the nozzle assembly further comprises a sealing ring disposed between the lower end of the cylinder and the glue chamber, and a nozzle sealing ring disposed between the glue chamber and the nozzle.

12. A non-contact precision pneumatic injection valve comprising:

a cylinder;

a needle disposed inside the cylinder; and a nozzle assembly releasably attached to a lower end of the cylinder, the nozzle assembly comprising:

a fixing claw;

a nozzle;

a glue chamber disposed between the lower end of the cylinder and the nozzle and connectable to a glue source; and a nozzle heater surrounding the nozzle, wherein the fixing claw engages the nozzle heater and rotatably engages the lower end of the cylinder to clamp the lower end of the cylinder, the glue chamber, the nozzle and the nozzle heater together.

13. The non-contact precision pneumatic injection valve of claim 12, wherein the nozzle assembly further comprises a sealing ring disposed between the lower end of the cylinder and the glue chamber, and a nozzle sealing ring disposed between the glue chamber and the nozzle.

14. The non-contact precision pneumatic injection valve of claim 13, wherein the fixing claw comprises a fixing portion that rotatably engages the lower end of the cylinder, and a pair of claws that engage a flange of the nozzle heater.

15. The non-contact precision pneumatic injection valve of claim 12, further comprising an adjustable stroke limiting component connected to an upper end of the cylinder.

16. The non-contact precision pneumatic injection valve of claim 15, wherein the adjustable stroke limiting component comprises:

a thread-toothed column threadedly engaging the upper end of the cylinder;

a spring-limiting column disposed inside and fixedly attached to the thread-toothed column, the spring-limiting column comprising a first protrusion ring;

a spring column axially movably disposed inside the spring-limiting column and comprising a second protrusion ring that is disposed lower than the first protrusion ring, a lower end of the spring column defining a stroke of the needle; and a compression spring, one end of the compression spring fixedly engaging the first protrusion ring and the other end of compression spring fixedly engaging the second protrusion so that the compression spring keeps the spring column at least partially inside the spring-limiting column.

17. The non-contact precision pneumatic injection valve of claim 16, wherein the one end of the compression spring fixedly engages the first protrusion ring by friction or tension.

18. The non-contact precision pneumatic injection valve of claim 16, wherein the other end of the compression spring fixedly engages the second protrusion ring by friction or tension.

19. The non-contact precision pneumatic injection valve of claim 16, wherein the thread-toothed column comprises a third protrusion ring that threadedly engages the upper end of the cylinder.

20. The non-contact precision pneumatic injection valve of claim 19, wherein in one position, the third protrusion ring is disposed lower than the first protrusion ring but higher than the second protrusion ring.

* * * * *